United States Patent [19]
Bunning

[11] 3,717,881
[45] Feb. 20, 1973

[54] STRIP CHART DRIVE FOR RECORDER
[75] Inventor: John G. Bunning, Indianapolis, Ind.
[73] Assignee: Esterline Corporation, New York, N.Y.
[22] Filed: Feb. 1, 1971
[21] Appl. No.: 111,210

[52] U.S. Cl. .....................346/136, 29/110, 226/190
[51] Int. Cl. .............................................G01d 15/28
[58] Field of Search ......346/136; 226/190, 191, 181; 29/110, 121, 124, 125

[56] References Cited
UNITED STATES PATENTS

| | | | |
|---|---|---|---|
| 2,805,113 | 9/1957 | Brown et al. | 346/136 X |
| 2,913,299 | 11/1959 | Clift | 346/136 X |
| 3,330,460 | 7/1967 | Wick | 226/175 |
| 3,330,461 | 7/1967 | Brand et al. | 226/193 |
| 3,341,858 | 9/1967 | Loubier | 346/136 |

Primary Examiner—Joseph W. Hartary
Attorney—Woodard, Weikart, Emhardt & Naughton

[57] ABSTRACT

A chart recording machine has a chart supply roll, timing roll and idler roll, chart marking area, output roll, and chart collecting roll. The output roll has a pair of O-rings loosely stored thereon while chart is passed from the supply roll through the marking area and onto the collection roll. The O-rings are movable from storage position to driving position on the output roll to drive the chart out through a slot in the housing, if desired, as an alternative to collecting the chart on the collection roll.

8 Claims, 5 Drawing Figures

PATENTED FEB 20 1973

3,717,881

INVENTOR
JOHN G. BUNNING

ATTORNEYS
Woodard, Weikart, Emhardt & Naughton

STRIP CHART DRIVE FOR RECORDER

BACKGROUND OF THE INVENTION

1. Field of the Invention

This invention relates generally to chart recording instruments, and more particularly to recording instruments of the strip chart type, and means for providing an optional disposition of the marked chart, either by collecting it inside the recording instrument, or by discharging it to the exterior of the recording instrument to be torn off and disposed of as desired.

2. Description of the Prior Art

Chart recording instruments using an elongated strip of recording medium such as paper, for example, are well known and widely used. Some of these employ a Z-folded strip, and others use a rolled strip. The present invention may be practiced with either type, although it appears to be more advantageous with the rolled type of chart.

There is a recording instrument marketed by the Rustrak Instrument Division of Gulton Industries, Inc. in Manchester, New Hampshire 03103. That instrument uses a strip chart. It has a take-up roller which collects the chart after marking. In order to discharge chart to the outside of the instrument instead of accumulating it on the take-up roller, a pair of drive belts normally stored behind the name plate of the instrument are passed around the take-up roller (take-up roller being removed for this purpose) and also passed around a guide roller (one end of which is temporarily removed for this purpose). These drive belts then serve to drive the guide roller and discharge the chart paper from the instrument. This procedure is rather involved, and therefore inconvenient and time consuming. It is an object of the present invention to provide a simpler means for implementing one or another chart discharge mode in a strip chart recording instrument.

Summary of the Invention

Described briefly, in a typical embodiment of the present invention, a roller is provided at the output end of the chart marking area, this roller having drive means associated therewith for driving it whenever the chart drive and timing means for the instrument are in operation. This roller normally serves as a support for the chart in its path of movement from the marking area to the chart collecting roller. However it has provision therein for inactively storing friction means thereon. The friction means may be conveniently moved to an active position on the roller and thereby provide positive drive for the chart at this roller. Under these circumstances, the chart can be driven through an opening in the housing to the exterior of the instrument housing to be torn off at will. In this optional mode of operation, the chart is no longer collected on the collection roller although the latter may remain in place in the machine with so much of the chart thereon as has been collected thereon until the time of severing the chart to project the severed end to the opening in the case for a "feed through" mode of operation.

DESCRIPTION OF THE PREFERRED EMBODIMENT

Figure 1:
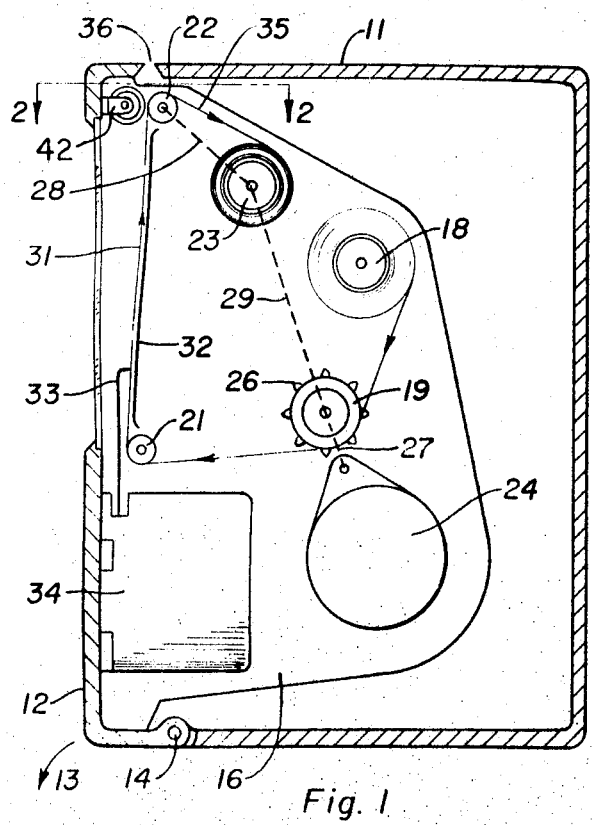
FIG. 1 is a section through a strip chart recorder showing a typical embodiment of the invention in the re-roll mode of operation.

Referring now to the drawings in detail, the recording instrument case 11 has a front door 12 thereon hinged at its lower margin to the front margin of the bottom of the case or housing to pivot downwardly in the direction of arrow 13 about the axis 14. In this way, the instrument can be opened for access to the interior thereof. A mechanism mounting frame is secured to the door 12 and may include a pair of horizontally spaced upstanding side plates like the side plate 16 of FIG. 1 and plates 16 and 17 of FIG. 2. These serve to support the ends of a chart supply roller 18, timing roller 19, idler roll 21, output roll 22, and chart collection roll 23. The mounting of the chart drive motor 24 to the side plates, makes it possible to have access to all of these components immediately when the door 12 is swung downwardly about its pivot. A similar construction is shown in the United States Pat. No. 3,048,848 issued to R. W. May on Aug. 7, 1962.

The chart timing roll is provided with a plurality of teeth 26 thereon in conventional manner to engage series of spaced apertures along the length of the chart to keep it in time with the drive motor 24 in conventional manner, there being a chain and sprocket or gear drive from the motor to the roll 19 as indicated schematically by the dotted line 27. Similarly, and according to a feature of this invention, the output roll 22 is geared, sprocketed or otherwise connected to the motor 24 as indicated by the dotted line 28 so that it is driven whenever the roll 19 is driven. The chart collection roll 23 is also driven by the motor 24 as indicated by the dotted line 29. However there can be some slippage in the drive between the motor and the collection roll by suitable clutching or other means to enable maintenance of constant tension on the chart 31 as it passes from the timing roll 19, around the idler roll 21 and output roll 22 to the collection roll 23, regardless of whether there is a very small accumulation of chart paper on the roll 23, or whether it has accumulated chart to about its maximum capacity. Similarly, spring tension or other suitable means can be applied to the supply roll 18 to maintain tension between the supply roll and timing roll 19, regardless of the diameter from which the chart paper is leaving the supply roll to pass around the timing roll. Suitable tensioning means and clutches are well known and widely used in the art, and need not be described further at this point.

During normal operation of the apparatus, the chart drive motor drives the timing roll 19 which pulls chart from the supply roll 18. The collection roll 23 is also driven by the chart drive motor to pull the chart paper down from around the output roller 22 to which it moves from in front of the platen 32 to which it is directed by the idler roller 21 which receives the chart from the timing roll 19. A suitable marking device 33 provides markings on the chart in response to signal inputs in a marker operation device designated schematically at 34 and, not, of itself, a part of the invention.

Figure 3:
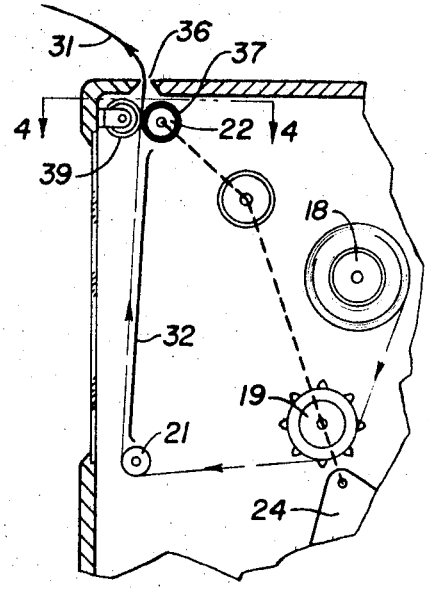
FIG. 3 is a fragmentary section like FIG. 1 but showing the apparatus in the "feed through" mode of operation.
Figure 4:
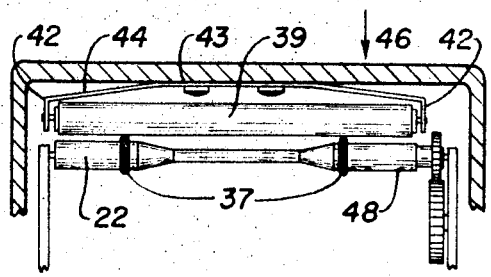
FIG. 4 is a section taken at the line 4—4 in FIG. 3 and viewed in the direction of the arrows.
Figure 5:
FIG. 5 is an enlarged cross section through the pressure roller.

At the top of the housing a slot is provided at 36. This slot is aligned with the general discharge path of the chart from the marking area between rolls 21 and 22 and in front of the platen. Accordingly, if the chart paper is severed intentionally at point 35, the end of the paper can be projected out through the slot as best shown in FIG. 3. The manner in which the chart paper is driven out through this slot according to one feature of the present invention will now be described with particular reference to FIGS. 3 and 4.

Figure 2:
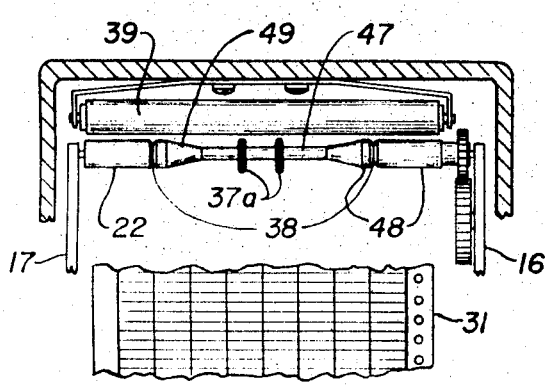
FIG. 2 is a section taken at the line 2—2 in FIG. 1 and viewed in the direction of the arrows.

As indicated in FIG. 3, the output roller 22 has a member 37 thereon of greater diameter than the roller itself. The nature of this member will be better understood by referring to FIG. 4 wherein it is seen to be an "O"-ring encircling the roller 22. There are two of these rings 37, each of them being received in a V-groove 38 (FIG. 2). Grooves of shapes other than a V-shape may be employed. As shown in FIG. 3, a cylindrical member 39 engages the chart paper opposite the location of engagement thereof by the O-rings 37. This member 39 is a cylindrical rubber sleeve on a cylindrical metal arbor 41 whose ends are mounted to the distal ends 42 of a spring mounting member affixed to the case door at 43. The portions 44 of the spring mount projecting forwardly from the central mounting portion 43 provide flexibility but urge the pressure roller assembly 39–41 in the rearward direction of arrow 46 to maintain engagement thereof on the chart.

The O-rings 37 fit snugly in the grooves 38 and therefore positively rotate with the roller 22 as it is driven by the motor 24. Being engaged with the chart paper, which is urged against them by the pressure roller, the O-rings 37 can thereby drive the chart paper away from the marking area and through the slot 36 to the exterior of the recording instrument. By way of example, these O-rings may have a nominal outside diameter of one-quarter inch, an inside diameter of 0.114 inches, with the cross sectional diameter of material itself being 0.070 inches. The material used may be a rubber or any other material having characteristics such as to provide sufficient friction engagement against the chart paper surface to drive it, and resilient enough to be manually pushed out of the grooves 38 when desired for movement to the storage position around the central portion 47 of the roller 22 as shown at 37A in FIG. 2. The pressure roller sleeve should be of a comparatively soft material to accommodate the slight deformation of the chart paper as it passes over the O-rings without marking the chart paper in the event that it is a pressure-sensitive type of paper. For this purpose, the pressure roller sleeve may be a silicone rubber sleeve of durometer hardness of a short A scale 50 plus or minus 5, the outside diameter being 7/32 inch with a 0.047 inch wall thickness.

As suggested above, during operation of the apparatus in the re-roll mode, the O-rings are permitted to rest loosely around the reduced center section 47 of the output roller, the diameter at this portion being 0.104 inches, for example. Noting that the inside diameter of the O-ring in its relaxed state is .114 inches, it will be apparent that the O-ring can slip around the central portion of the shaft and thus it can serve no driving function when in this location. Because the nominal outside diameter of the O-rings is 0.250 inches, and the nominal outside diameter of the roller 22 at the cylindrical surfaces 48 on both sides of the grooves 38 is 0.250 inches, it will be seen that the O-rings may or may not engage the chart paper during the re-roll mode but, in any event, they serve no driving function, nor do they interfere with slipping the chart paper into position between the output roller and the pressure roller for operation in the re-roll mode.

When it is desired to operate the instrument in the feed through mode, the chart paper is simply cut off or, in the event one is starting with a new roll, it is placed in the instrument in such manner that the end projects out through the slot 36 when the door is closed. The O-rings 37 are moved from their storage position into the grooves 38 which are typically of a 90° included angle V with the root diameter being 0.024 inches less than the outside diameter. Thus as the O-rings are moved from the storage position, along the tapered entrance cones 49 to their active operating position in the grooves 38, they are stretched so that upon snapping into the grooves they are snuggly retained in their drive position to drive the charts. These grooves 38 may be referred to as residence or feed-out grooves as they are the normal residence of the O-rings 37 when the instrument is operated in the feed through mode. When it is desired to again return to the re-roll mode, they are simply pushed back down through the ramp cones 49 to the central storage area between the grooved cylindrical surfaces 48. In view of the construction as described above, the present invention provides a simpler, more convenient and more direct approach to conversion of a strip chart recording instrument from a mode depositing the chart inside the machine, to another mode feeding it to the exterior of the machine.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In a strip chart recorder, having a chart accumulating mode of operation, and an optional chart exiting mode of operation, the combination comprising:
    a housing having a chart exit opening therein;
    a chart supply source in said housing;
    a chart accumulating depository in said housing;
    a roll in said housing adjacent said exit opening;
    roll drive means coupled to said roll;
    a pressure means adjacent said opening;
    a chart extending from said source, around said roll, to said depository when operating in said accumulating mode;
    and a friction member on said roll between the lateral edges of said chart and spaced from said pressure means;
    said roll including a first cylindrical outer surface receiving said chart thereon and a second outer surface extending through said friction member and retaining said friction member loosely thereon, a portion of said friction member being disposed between said second surface and said first surface, and said friction member being movable axially along said roll onto said first surface to expand said friction member and thereby reduce the space between said friction member and said pressure means, pinching said chart therebetween to drive said chart out through said exit opening for said chart exiting mode, instead of accumulating said chart in said depository;

a tapered third surface being joined to said first and second surface to facilitate movement of said friction member from said second surface onto said first surface.

2. The combination of claim 1 wherein:

said first surface has a groove therein, said friction member being receivable snugly in said groove and thereupon having an outside diameter exceeding the diameter of said first surface to project from said groove and engage said chart.

3. The combination of claim 2 wherein:

said pressure means include a spring loaded pressure roller having an axis parallel to the axis of said roll, and engaging the chart opposite engagement thereof by said friction member during the exit mode operation.

4. The combination of claim 3 and further comprising:

a resilient elongate sleeve on said roller engaging said chart.

5. The combination of claim 2 and further comprising:

another cylindrical outer surface on said output roll and having a groove therein;

a second friction member snugly received in and projecting out of the groove in said another surface to drive said chart, said second friction member being movable axially from its residence groove to a storage position encircling said second surface.

6. The combination of claim 5 wherein:

said friction members are O-rings.

7. The combination of claim 1 wherein:

said depository is a chart collecting roll, said chart source is being a supply roll, said chart being severable at said opening for exiting through said opening, or receivable on said collecting roll;

chart timing means engaging said chart;

chart drive means including a motor and power transmission means constantly engaging said timing means and said roll drive means, both when said chart is driven out through said opening, and when said chart is accumulated on said collecting roll.

8. The combination of claim 7 and further comprising:

chart support means between said supply roll and the said roll adjacent said opening and defining a marking area;

chart marker means disposed for engagement of said chart opposite said support means.

* * * * *